United States Patent
Yagisawa (10) Patent No.: US 8,400,514 B2
(45) Date of Patent: Mar. 19, 2013

(54) ANTIVIBRATION ACTUATOR AND LENS UNIT AND CAMERA EQUIPPED WITH SAME

(75) Inventor: Osamu Yagisawa, Saitama (JP)

(73) Assignee: Tamron Co., Ltd., Saitama (JP)

( * ) Notice: Subject to any disclaimer, the term of this patent is extended or adjusted under 35 U.S.C. 154(b) by 100 days.

(21) Appl. No.: 12/929,158

(22) Filed: Jan. 5, 2011

(65) Prior Publication Data
US 2011/0176012 A1 Jul. 21, 2011

(30) Foreign Application Priority Data
Jan. 15, 2010 (JP) ................................. 2010-006932

(51) Int. Cl.
H04N 5/228 (2006.01)
(52) U.S. Cl. .................................................... 348/208.2
(58) Field of Classification Search .............. 348/208.1, 348/208.2, 208.3, 208.5, 208.7, 208.8; 396/55, 396/52, 53, 144; 359/557, 554, 555
See application file for complete search history.

(56) References Cited

U.S. PATENT DOCUMENTS

| 8,121,467 B2 * | 2/2012 | Suzuka ........................ 396/55 |
| 8,139,291 B2 * | 3/2012 | Nakamura et al. ........... 359/557 |
| 2007/0183764 A1 * | 8/2007 | Imura et al. .................... 396/55 |
| 2007/0188620 A1 * | 8/2007 | Takahashi ............... 348/208.99 |
| 2007/0206934 A1 | 9/2007 | Ishii et al. |
| 2009/0060485 A1 * | 3/2009 | Takahashi ....................... 396/55 |
| 2010/0166401 A1 * | 7/2010 | Akutsu ........................... 396/55 |
| 2010/0214426 A1 * | 8/2010 | Kimura ................... 348/208.99 |
| 2011/0176012 A1 * | 7/2011 | Yagisawa ................... 348/208.2 |
| 2011/0317266 A1 * | 12/2011 | Miyamori et al. ............ 359/557 |

FOREIGN PATENT DOCUMENTS
JP 2007-206102 A 8/2007
JP 2008-122531 A 5/2008

* cited by examiner

Primary Examiner — Aung S Moe
(74) Attorney, Agent, or Firm — Jacobson Holman PLLC (57) ABSTRACT

The present invention is an antivibration actuator including an affixing plate (12), a moving frame (14) to which an image stabilizing lens (16) is attached, and a drive means for generating drive force in a first direction and a second direction; the drive means is furnished with a drive magnet (22) and a first drive coil (20a) and second drive coil (20b) disposed on substantially the same plane so as to face that the drive magnet; a first magnetic boundary line (C1) and a second magnetic boundary line (C2) disposed to connect to the first magnetic boundary line are provided on the drive magnet, and when current flows, a first direction drive force is generated; the second drive coil is disposed to face the second magnetic boundary line, and when current flows, a second direction drive force is generated.

12 Claims, 7 Drawing Sheets

PRIOR ART

ANTIVIBRATION ACTUATOR AND LENS UNIT AND CAMERA EQUIPPED WITH SAME

TECHNICAL FIELD

The present invention relates to an antivibration actuator, and more particularly to an antivibration actuator and a lens unit and camera equipped therewith for moving an image stabilizing lens within a plane perpendicular to the optical axis thereof.

BACKGROUND ART

Figure 12:
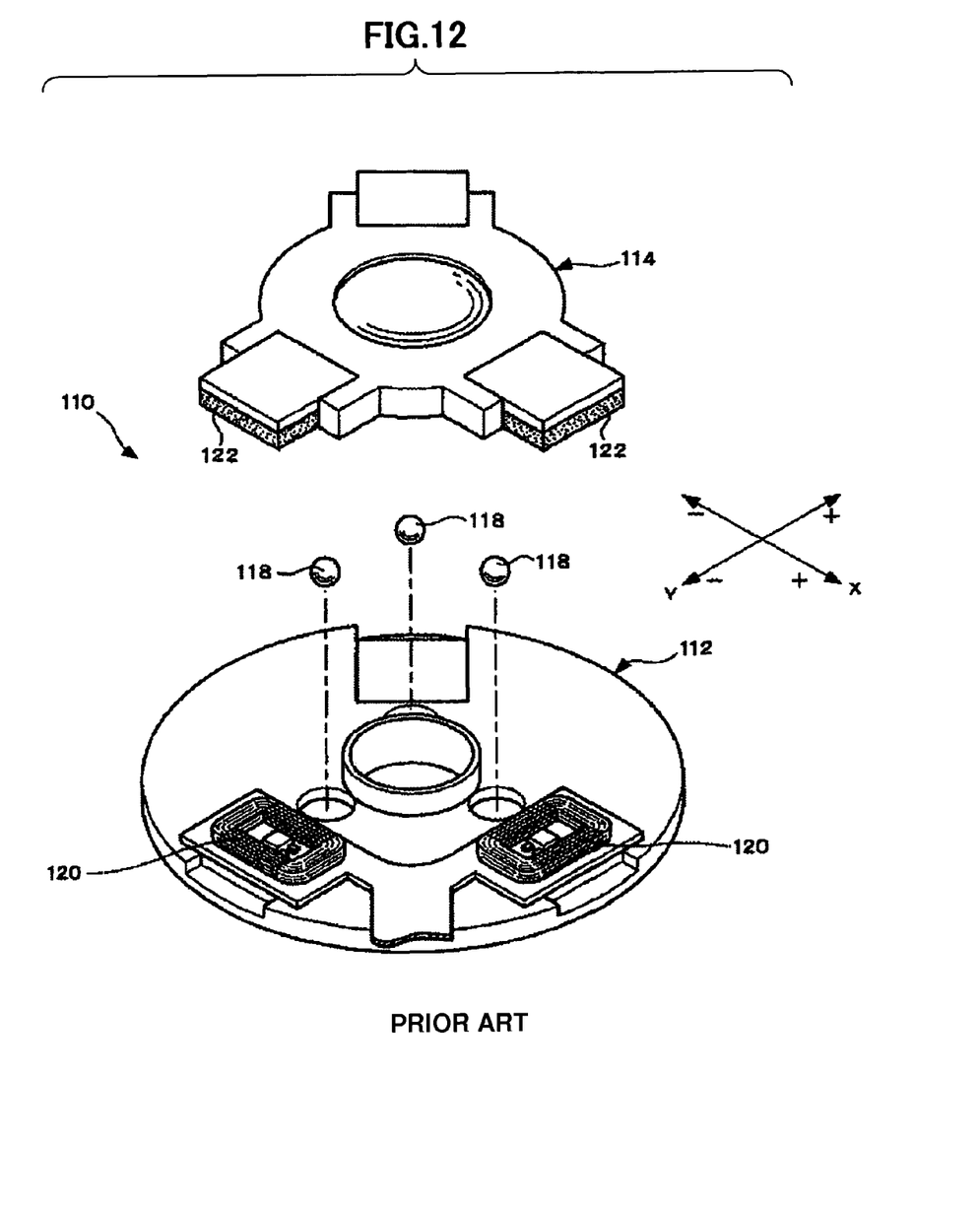
FIG. 12 A diagram showing a structural overview of a conventional actuator.

The JP-A-2008-122531 (Patent Document 1) sets forth an actuator. FIG. 12 depicts a structural overview of this actuator. As shown in FIG. 12, an actuator 110 comprises a fixed portion 112 and a movable portion 114 to which an image stabilizing lens is attached; the movable portion 114 is supported so as to be translationally and rotationally movable relative to the fixed portion 112. The movable portion 114 is driven by two linear motors comprising two groups of drive coils 120 and drive magnets 122. These two linear motors are disposed vertically above the image stabilizing lens on the same plane perpendicular to the optical axis, and in such a way as to surround the image stabilizing lens in the horizontal direction.

The JP-A-2007-206102 (Patent Document 2) sets forth an image blur compensation device. Within this image blur compensation device, movement of the movable portion to which the image stabilizing lens is attached is guided by a guide portion, and the movable portion is driven in the horizontal and vertical directions, respectively, by two linear motors provided under the image stabilizing lens. Within this image blur compensation device, the two linear motors are disposed so as to overlap the direction of the optical axis.

Patent Document 1: Published Unexamined Application JP-A-2008-122531
Patent Document 2: Published Unexamined Application JP-A-2007-206102

DISCLOSURE OF THE INVENTION

Problems the Invention is to Resolve

However, in the actuator set forth in the JP-A-2008-122531, the disposition of a linear motor around the image stabilizing lens required a large space around the image stabilizing lens, leading to the problem of increased actuator size.

In the image blur compensation device set forth in the JP-A-2007-206102, on the other hand, two linear motors are disposed under the image blur compensation device, enabling the projected area in the actuator optical axial direction to be reduced. In this image blur compensation device, however, the two linear motors are disposed so as to overlap in the optical axial direction, leading to the problem of increased thickness of the image blur compensation device in the optical axial direction.

Therefore the present invention has the objective of providing an actuator and a lens unit and camera equipped therewith capable of a reduced projected area in the optical axial direction and reduced thickness in the optical axial direction.

Means for Solving the Problems

In order to resolve the aforementioned problems, the present invention is an antivibration actuator for moving an image stabilizing lens within a plane perpendicular to the optical axis thereof, comprising a fixed portion, a movable portion to which the image stabilizing lens is attached, and drive means for generating drive force in a first direction and a second direction so that the movable portion is moved within a plane perpendicular to the optical axis of the image stabilizing lens; whereby the drive means is furnished with a drive magnet disposed on one of either the fixed portion or the movable portion, and a first drive coil and second drive coil are attached to the other of either the fixed portion or the movable portion and disposed on substantially a same plane; and the drive magnet is provided with a first magnetic boundary line and a second magnetic boundary line disposed to connect to the first magnetic boundary line; the first drive coil is disposed facing the first magnetic boundary line, and drive force is generated in the first direction when current flows therein; the second drive coil is disposed facing the second magnetic boundary line, and drive force is generated in the second direction when current flows therein.

In the present invention thus constituted, the movable portion to which the image stabilizing lens is attached is moved by a drive means relative to the fixed portion within a plane perpendicular to the optical axis. The drive means comprises a drive magnet, within which a first magnetic boundary line and a second magnetic boundary line connected thereto are formed, and a first drive coil and second drive coil disposed on substantially the same plane. A drive force is generated in a first direction when current flows in the first drive coil disposed facing the first magnetic boundary line. A drive force is generated in a second direction when current flows in the second drive coil disposed facing the second magnetic boundary line. This drive force moves the movable portion.

In the present invention thus constituted, the first drive coil and the second drive coil are disposed in substantially the same plane, so the antivibration actuator can be reduced in thickness in the optical axial direction and, since the first magnetic boundary line and second magnetic boundary line of the drive magnet are disposed to connect, the projected area of the antivibration actuator in the optical direction can be reduced. This enables a reduction in the size of the antivibration actuator.

In the present invention, the first magnetic boundary line and the second magnetic boundary line are preferably registered so that the image stabilizing lens is positioned within a region defined by extension lines of the first and second magnetic boundary lines.

In the present invention thus constituted, the first magnetic boundary line and the second magnetic boundary line are positioned so that the image stabilizing lens is disposed within a region defined by their extension lines, therefore each of the magnetic boundaries can be placed in closer proximity to the image stabilizing lens, and the projected area of the antivibration actuator in the optical axial direction can be reduced.

In the present invention, the first magnetic boundary line and the second magnetic boundary line are preferably registered to form a substantially right angle, and the first drive coil and the second drive coil are respectively positioned to be line symmetrical with respect to a bisecting line of the right angle.

In the present invention thus constituted, the first magnetic boundary line and the second magnetic boundary line are registered to form a substantially right angle, therefore the first and second directions in which drive force is generated are substantially perpendicular, enabling efficient driving of the movable portion. Since the first, drive coil and the second drive coil are positioned to be symmetrical with respect to a line bisecting the right angle, drive force can be generated in a balanced fashion in the first direction and the second direction.

In the present invention, the first drive coil and the second drive coil are preferably disposed within a region formed by a first straight line extending from the optical axis of the image stabilizing lens parallel to the first magnetic boundary line, and a second straight line extending from the optical axis of the image stabilizing lens parallel to the second magnetic boundary line.

In the present invention thus constituted, the first drive coil and the second drive coil are together disposed within a region formed by first and second straight lines, thereby enabling the projected area of the antivibration actuator in the optical direction to be reduced.

In the present invention, the first magnetic boundary line and the second magnetic boundary line are preferably registered so that a bisecting line of the first and second magnetic boundary lines and the optical axis of the image stabilizing lens intersect.

In the present invention thus constituted, the magnetic boundary line bisecting line and the optical axis of the image stabilizing lens intersect, thereby enabling a well-balanced drive force to be generated relative to the image stabilizing lens.

In the present invention, the drive magnet is preferably formed in a shape which is substantially symmetrical with respect to a bisecting line of the first and second magnetic boundary lines.

In the present invention thus constituted, the drive magnet is formed in a shape which is symmetrical with respect to the bisecting line, therefore the distribution of drive magnet mass is symmetrical with respect to the bisecting line, and the generated magnetic field can be made symmetrical with respect to the bisecting line, so that drive force can be generated in a well-balanced manner.

In the present invention, the first drive coil is preferably constituted to have a side substantially parallel to the first magnetic boundary line, and a side arrayed along a bisecting line of the first and second magnetic boundary lines; and the second drive coil is constituted to have a side substantially parallel to the second magnetic boundary line, and a side arrayed along the bisecting line.

In the present invention thus constituted, the drive coil can be disposed in a small space at a position proximate to the bisecting line by providing a side along the bisecting line while generating a drive force in a direction perpendicular to the magnetic boundary line using the side substantially parallel to the magnetic boundary line.

In the present invention, the first drive coil is preferably formed in a shape substantially line symmetrical with respect to a straight line intersecting the first magnetic boundary line at a right angle, and the second drive coil is formed in a shape substantially line symmetrical with respect to a straight line intersecting the second magnetic boundary line at a right angle.

In the present invention thus constituted, the drive coil is formed in a shape substantially line symmetrical with respect to a straight line intersecting the first magnetic boundary line at a right angle, therefore the component of the generated drive force parallel to the magnetic boundary line can be canceled, and generation of unnecessary drive force can be suppressed.

In the present invention, the first drive coil is preferably constituted as a hexagon having a side substantially parallel to the first magnetic boundary line, and a side arrayed along the bisecting line; and the second drive coil is constituted as a hexagon having a side substantially parallel to the second magnetic boundary line, and a side arrayed along the bisecting line.

In the present invention thus constituted, generation of unnecessary drive force can be suppressed while the placement of the drive coil in a small space positioned proximate to the bisecting line is enabled.

The present invention preferably further comprises a first magnetic sensor and a second magnetic sensor for respectively detecting displacement of the movable portion in the first direction and the second direction by detecting the magnetism of the drive magnet; the first magnetic sensor is disposed inside the first drive coil winding, and the second magnetic sensor is disposed inside the second drive coil winding.

In the present invention thus constituted, the same magnet can serve as the position detecting magnet and the drive magnet, and the magnetic sensor is disposed inside the drive coil winding, therefore space for placement of the magnetic sensor can be omitted.

The lens unit of the present invention comprises a lens barrel, an imaging lens disposed within the lens barrel, and the antivibration actuator of the present invention, attached to the lens barrel.

The camera of the present invention further comprises the lens unit of the present invention and a camera body to which this lens unit is attached.

Effect of the Invention

Both the projected area in the optical axial direction and the thickness in the optical axial direction can be reduced using the antivibration actuator, the lens unit equipped therewith, and the camera of the present invention.

BRIEF DESCRIPTION OF FIGURES

FIG. 4 (a) a front elevation and (b) a cross-section through b-b of an antivibration actuator used in a camera embodiment of the present invention.

EMBODIMENTS

Next, referring to the attached figures, we discuss embodiments of the present invention.

Figure 1:
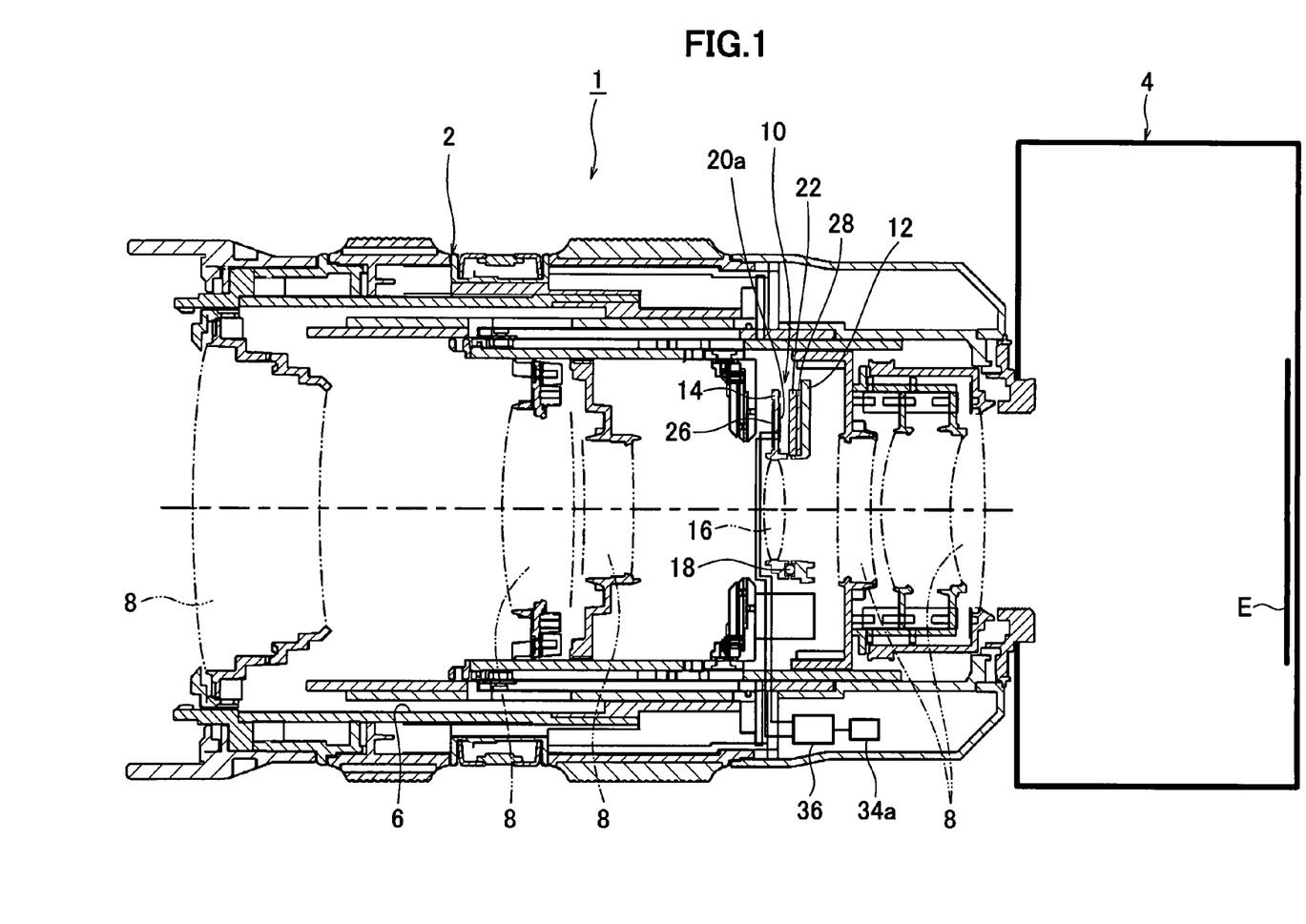
FIG. 1 A cross-section of a camera according to an embodiment of the present invention.

First, referring to FIGS. 1 through 8, we discuss a camera according to an embodiment of the present invention. FIG. 1 is a cross-section of a camera according to an embodiment of the present invention.

As shown in FIG. 1, the embodied camera 1 of the present invention has a lens unit 2 and a camera body 4. The lens unit 2 has a lens barrel 6, multiple imaging lenses 8 disposed within this lens barrel, an antivibration actuator 10 for moving an image stabilizing lens 16 within a predetermined plane, and gyros 34a and 34b serving as vibration detection means for detecting vibration in the lens barrel 6 (only 34a is shown in FIG. 1).

The embodied camera 1 of the present invention detects vibration using the gyros 34a and 34b, actuates the antivibration actuator 10 based on the detected vibration to move the image stabilizing lens 16, and thereby stabilizes the image focused on image capture element E within the camera body 4. In the present invention, a piezoelectric oscillating gyro is used for gyros 34a and 34b. Note that in the present embodiment the image stabilizing lens 16 comprises a single lens, but the lens used to stabilize the image may also be a set of multiple lenses. In the present Specification, "image stabilizing lens" includes single lenses and lens sets for stabilizing images.

The lens unit 2 is attached to the camera body 4 so as to focus incident light on the image capture element E.

The generally cylindrical lens barrel 6 holds within it multiple imaging lenses 8, and enables focus adjustment by moving a portion of the imaging lenses 8.

Figure 2:
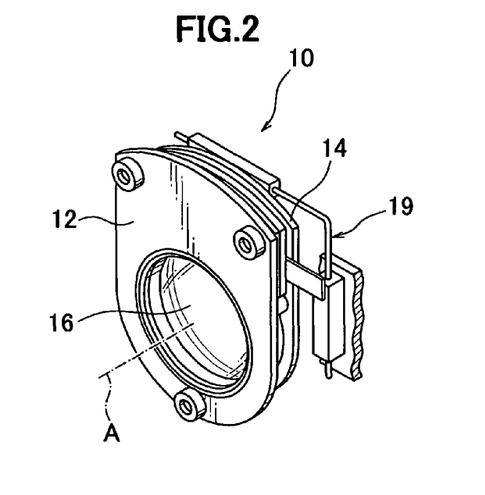
FIG. 2 A perspective drawing of an antivibration actuator used in a camera embodiment of the present invention.
Figure 3:
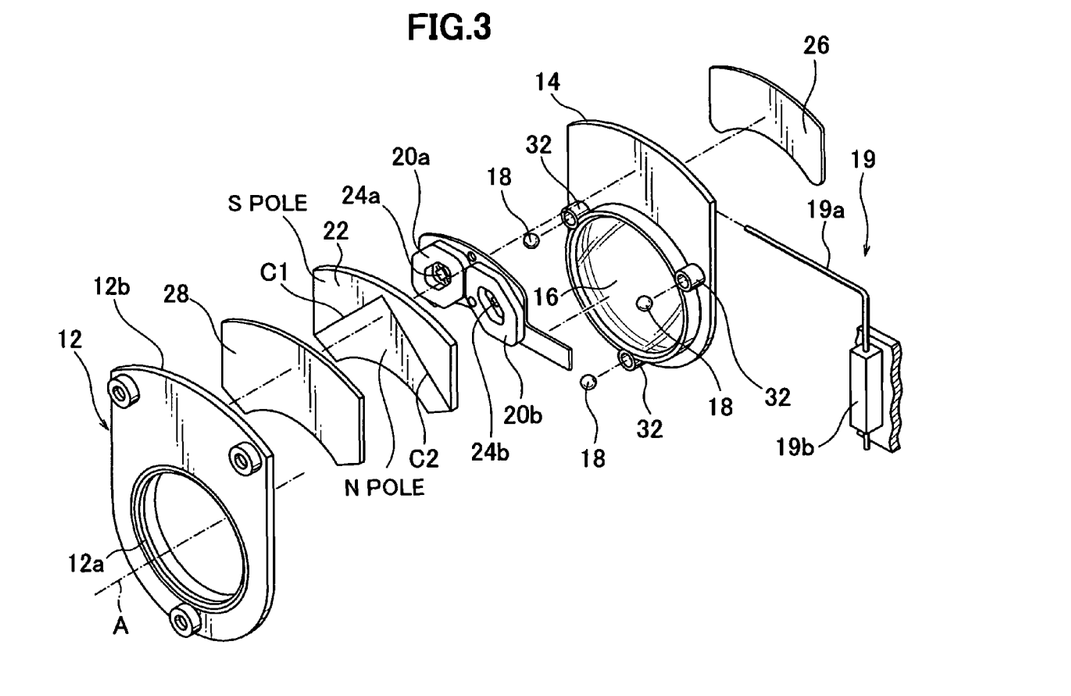
FIG. 3 An exploded perspective drawing of an antivibration actuator used in a camera embodiment of the present invention.
Figure 4:
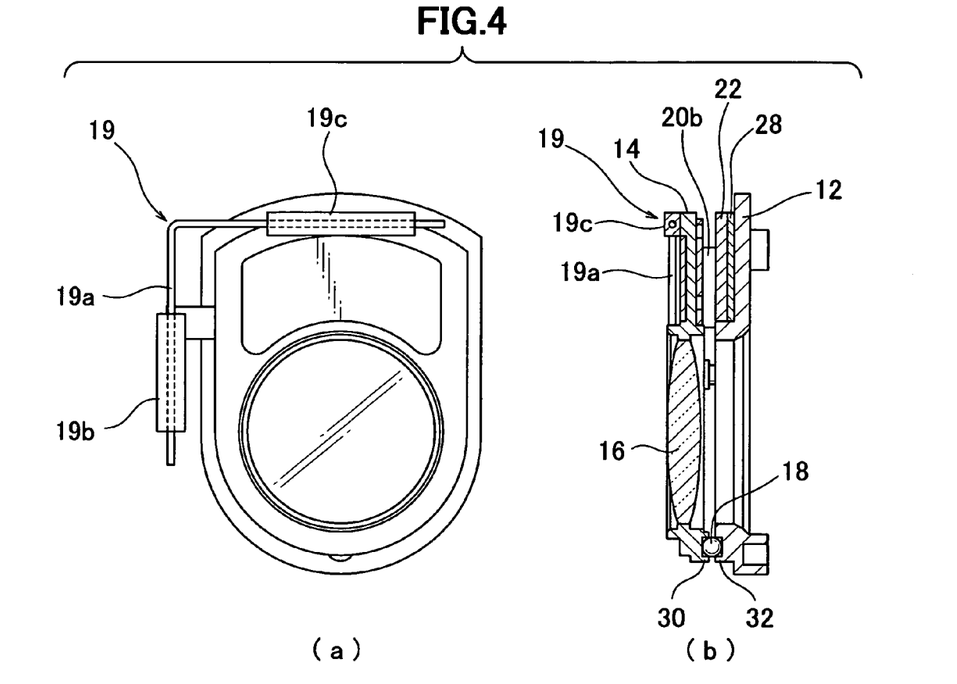
Figure 5:
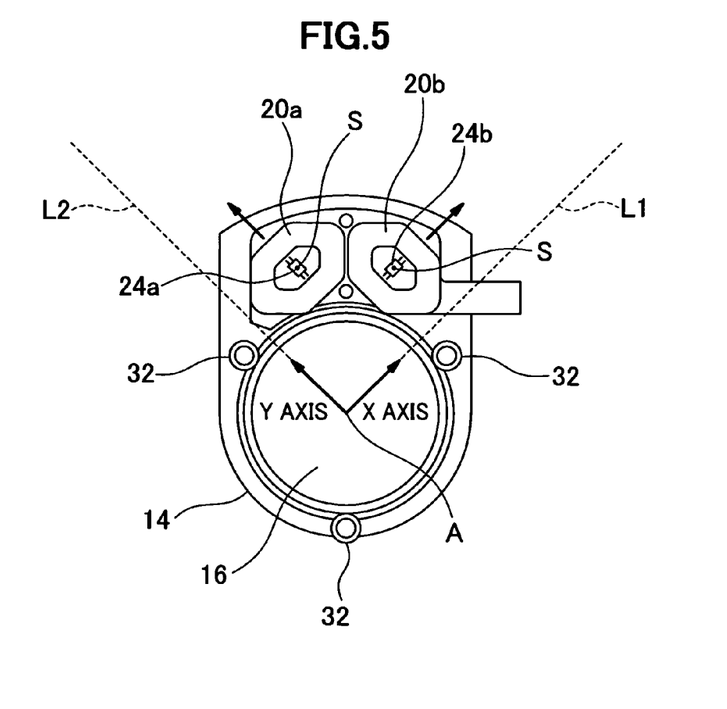
FIG. 5 A rear elevation of the movable portion in an antivibration actuator used in a camera embodiment of the present invention.
Figure 6:
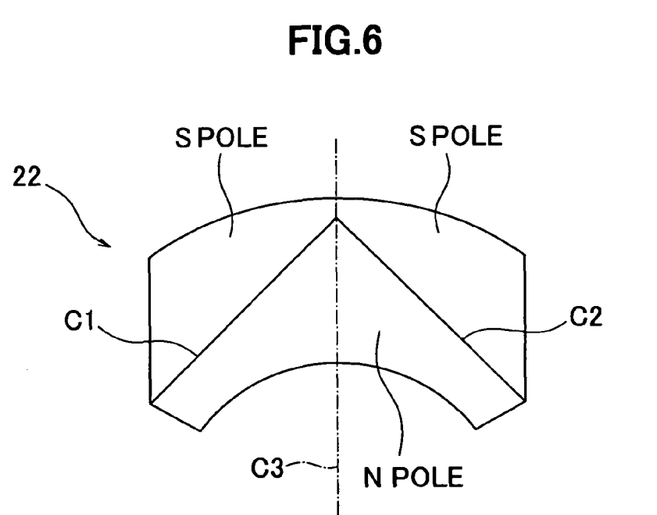
FIG. 6 A front elevation of a drive magnet in an antivibration actuator used in a camera embodiment of the present invention.
Figure 7:
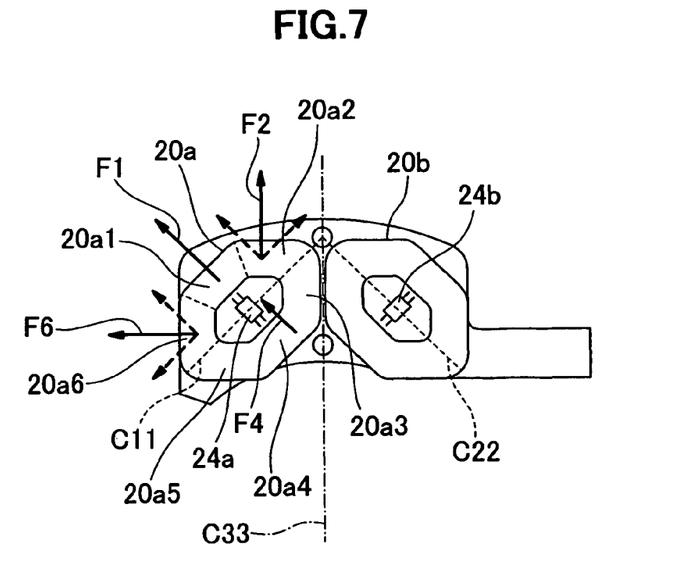
FIG. 7 A front elevation of the drive coil in an antivibration actuator used in a camera embodiment of the present invention.

Next, referring to FIGS. 2 through 8, we discuss the antivibration actuator 10. FIG. 2 is a perspective view of the antivibration actuator 10; FIG. 3 is an exploded view thereof. FIG. 4(a) is a front elevation of the antivibration actuator 10; FIG. 4(b) is a cross-section through b-b. FIG. 5 is a rear elevation of the movable portion of the antivibration actuator 10. FIG. 6 is a front elevation of the antivibration actuator 10 drive magnet. FIG. 7 is a front elevation of the antivibration actuator 10 drive coil.

As shown in FIGS. 2 through 4, the antivibration actuator 10 has an affixing plate 12 serving as a fixed portion affixed within the lens barrel 6, a moving frame 14 serving as movable portion supported so as to be translationally movable with respect to the affixing plate 12, and three steel balls 18 serving as movable support means for supporting the moving frame 14. A guide means 19 is provided on the moving frame 14; the guide means 19 guides the moving frame 14 so that the moving frame 14 moves translationally within a plane perpendicular to the optical axis A of the image stabilizing lens 16.

Furthermore, the antivibration actuator 10 has a first drive coil 20a and a second drive coil 20b attached to the moving frame 14, a drive magnet 22 attached to the affixing plate 12 in opposition to the drive coils 20a and 20b, and a first magnetic sensor 24a and second magnetic sensor 24b respectively disposed on the inside of the drive coils 20a and 20b.

The antivibration actuator 10 has an attaching yoke 26 attached to the rear side of the moving frame 14, and a back yoke 28 attached to the drive magnet 22, for attracting the moving frame 14 to the affixing plate 12 by the magnetic force of the drive magnet. Note that the first drive coil 20a, the second drive coil 20b, and the drive magnet 22 attached at a position corresponding thereto together constitute a drive means for driving the moving frame 14 with respect to the affixing plate 12.

Moreover, as shown in FIG. 1, the antivibration actuator 10 has a controller 36 for controlling the current sourced to the first and second drive coils 20a and 20b based on the vibration detected by the gyros 34a and 34b and the moving frame 14 position information detected by the first and second magnetic sensors 24a and 24b.

The antivibration actuator 10 moves the moving frame 14 translationally relative to the affixing plate 12 affixed to the lens barrel 6, within a plane parallel to the image capture element E; by so doing it moves the image stabilizing lens 16 attached to the moving frame 14 so that no blur of the image formed on the image capture element E occurs even if the lens barrel 6 vibrates.

The affixing plate 12 is a plate-shaped member having an aperture portion 12a for admitting incident light, and a flat plate portion 12b for attaching the drive magnet 22. The back yoke 28 and the drive magnet 22 are stacked on and attached to the flat plate portion 12b.

As shown in FIGS. 3 and 6, the drive magnet 22 is a generally rectangular plate-shaped magnet; its lower edge is formed in an arc to follow the affixing plate 12 aperture portion 12a, and its upper edge is also formed in an arc to match the shape of the upper edge of the affixing plate 12. In addition, a first magnetic boundary line C1 and a second magnetic boundary line C2 are formed on the drive magnet 22. These first magnetic boundaries C1 and C2 are generally straight lines, and are connected to form a right angle. The peak of the right angle formed by the first magnetic boundaries C1 and C2 is directed upward, and is disposed in such a way that the image stabilizing lens 16 is positioned within the right angle. The peak of the right angle formed by the first magnetic boundaries C1 and C2 is positioned vertically above the optical axis A of the image stabilizing lens 16, and the bisecting line C3 of the right angle formed by the first magnetic boundaries C1 and C2 is directed vertically upward and positioned to intersect the optical axis A. Furthermore, in the present embodiment the drive magnet 22 is magnetized so that the upper side of the first magnetic boundaries C1 and C2 is the north pole and the bottom side thereof is the south pole, while its shape is line symmetrical with respect to the bisecting line C3. Note that in the present Specification "magnetic boundary line" refers to the line connecting the points at which polarity changes from S to N when the edges of the drive magnets respectively form the N and S poles.

The back yoke 28 comprises magnetic material with a plate shape similar to the drive magnet 22. The back yoke 28 forms a magnetic circuit together with the drive magnet 22 and the attaching yoke 26, and effectively shapes the magnetic field passing through the first drive coil 20a and the second drive coil 20b. In other words, the back yoke 28 is attached to the affixing plate 12, and the drive magnet 22 is further stacked and attached over that. The first drive coil 20a and the second drive coil 20b are attached to the surface of the moving frame 14 on the side opposing the drive magnet 22, and the attaching yoke 26 is attached at a position whereby it overlaps the drive coils on the opposite surface.

The moving frame 14 is a plate-shaped member on the bottom aperture portion of which the image stabilizing lens 16 is attached, and on the top portion of which the first drive coil 20a and the second drive coil 20b are attached; it is disposed to parallelly overlap the affixing plate 12. Current is sourced to each of the drive coils to translationally move the moving frame 14 within a plane perpendicular to the optical axis A.

As shown in FIG. 7, the first and second drive coils 20a and 20b are formed in the same shape, and the windings thereof are wound in a rounded-corner hexagon shape. The first drive coil 20a is formed to be line symmetrical with respect to the first magnetic boundary line C1, and to be line symmetrical with respect to a straight line intersecting the first magnetic boundary line C1 at a right angle. Similarly, the second drive coil 20b is formed to be line symmetrical with respect to the second magnetic boundary line C2, and to be line symmetrical with respect to a straight line intersecting the second magnetic boundary line C2 at a right angle.

The first and second drive coils 20a and 20b are disposed on the same plane, and their longest diagonals are disposed to respectively overlap the projection lines C11 and C22 in the optical axial direction of the drive magnet 22 first magnetic boundary line C1 and second magnetic boundary line C2. Moreover, the first and second drive coils 20a and 20b are disposed at positions which are line symmetrical with respect to the bisecting line C33 made when the bisecting line C3 bisecting the right angle formed by the first magnetic boundary line C1 and the second magnetic boundary line C2 is projected in the optical axis A direction. In addition, the first and second drive coils 20a and 20b are disposed so that one of their sides is parallel to the bisecting line C33.

Formed along each respective side of the first drive coil 20a hexagon are a first winding portion 20a1, a second winding portion 20a2, a third winding portion 20a3, a fourth winding portion 20a4, a fifth winding portion 20a5, and a sixth winding portion 20a6. Of these winding portions, the first winding portion 20a1 and the fourth winding portion 20a4 are oriented in parallel to the first magnetic boundary line C1. The third winding portion 20a3 is disposed in parallel to the bisecting line C33 so as to contact the bisecting line C33.

When current flows in the first drive coil 20a, the first winding portion 20a1 and fourth winding portion 20a4 respectively generate thrusts F1 and F4 in the same direction, perpendicular to the first magnetic boundary line C1. The second winding portion 20a2 and sixth winding portion 20a6 respectively generate thrusts F2 and F6 in a direction perpendicular to that in which the windings are oriented. As shown in FIG. 7 with respect to the thrusts F2 and F6, the size of their perpendicular component relative to the first magnetic boundary line C1 is equal in the same direction, and the size of their parallel component relative to the first magnetic boundary line C1 is equal in the opposite direction. The parallel component of the thrust F2 and F6 relative to the first magnetic boundary line C1 is therefore canceled, and of the thrust generated by the second winding portion 20a2 and the sixth winding portion 20a6, only the component which is perpendicular to the first magnetic boundary line C1 acts as thrust to drive the moving frame 14. Similarly, the parallel component of the thrust generated by the third winding portion 20a3 and the fifth winding portion 20a5 relative to the first magnetic boundary line C1 is canceled, and only the perpendicular component acts as thrust to drive the moving frame 14. Therefore for the first drive coil 20a as a whole, the flow of current generates a perpendicular thrust relative to the first magnetic boundary line C1 which constitutes the first direction.

As shown in FIG. 7, the second drive coil 20b is attached in a direction whereby its longest diagonal is rotated 90° with respect to the first drive coil 20a. The two winding portions of the second drive coil 20b disposed in parallel to the second magnetic boundary line C2 therefore respectively generate thrust in the same perpendicular direction relative to the second magnetic boundary line C2. The first winding portion 20a1 is disposed in parallel to the bisecting line C33 so as to contact the bisecting line C33. By this arrangement, thrust as a whole is generated in a direction perpendicular to the second magnetic boundary line C2, which is the second direction, when current flows in the second drive coil 20b.

As shown in FIG. 5, the first drive coil 20a and second drive coil 20b are disposed within a region formed by a first straight line L1 extending from the image stabilizing lens 16 optical axis A parallel to the first magnetic boundary line C1, and a second straight line L2 extending from the image stabilizing lens 16 optical axis A parallel to the second magnetic boundary line C2. The projected area in the optical axial direction of the antivibration actuator is thus reduced by concentrating the placement of the first drive coil 20a and the second drive coil 20b within the region defined by the straight lines L1 and L2.

As shown in FIGS. 3 and 4, the three steel balls 18 are constrained between the affixing plate 12 and the moving frame 14, each separated by a center angle of 120° on the perimeter of a circle centered on optical axis A. Each of the steel balls 18 is disposed within steel ball holders 30 and 32 respectively formed on the affixing plate 12 and the moving frame 14. Depressions are formed in the steel ball holders 30 and 32; the steel balls 18 are able to roll smoothly therein, and are prevented from falling out. The moving frame 14 is attracted by the drive magnet 22 to the affixing plate 12, so that the steel balls 18 are constrained between the affixing plate 12 and the moving frame 14. The moving frame 14 is thus supported on a plane parallel to the affixing plate 12, and movement of the moving frame 14 relative to the affixing plate 12 is permitted by each of the constrained but rolling steel balls 18.

As shown in FIGS. 2 through 4, the guide means 19 has an L-shaped shaft 19a, a fixed-side sliding bearing 19b, and a moving-side sliding bearing 19c provided on the moving frame 14. The fixed-side sliding bearing 19b affixed within the lens barrel 6 receives the vertical portion of the L-shaped shaft 19a so that it can slide in the vertical direction. At the same time, the moving-side sliding bearing 19c provided on the moving frame 14 receives the horizontal portion of the L-shaped shaft 19a so that it can move in the horizontal direction. Rotational movement of the moving frame 14 within the plane perpendicular to the optical axis A is constrained by the guide means 19 thus constituted, and only translational movement of the moving frame 14 is permitted.

As shown in FIGS. 5 and 7, a first magnetic sensor 24a and a second magnetic sensor 24b are respectively disposed inside the first drive coil 20a and the second drive coil 20b. The first magnetic sensor 24a measures the displacement of the moving frame 14 in a direction perpendicular to the first magnetic boundary line C1 in response to the drive force generated by the first drive coil 20a and the drive magnet 22 in the region of the first magnetic boundary line C1. The second magnetic sensor 24b measures the displacement of the moving frame 14 in the direction perpendicular to the second magnetic boundary line C2 in response to the drive force generated by the second drive coil 20b and the drive magnet 22 in the region of the second magnetic boundary line C2. The first magnetic sensors 24a and 24b are disposed so that when the moving frame 14 is in a neutral position, their respective sensitivity center points S are positioned on the drive magnet 22 first magnetic boundary line C1 and second magnetic boundary line C2. Note that in the present embodiment a Hall element is used as the magnetic sensor.

The output signal from the magnetic sensor is 0 when the magnetic sensor sensitivity center point S is positioned on the drive magnet magnetic boundary line; when the drive magnets move and the sensitivity center point S leaves the drive magnet magnetic boundary line, the magnetic sensor output signal changes. In the region in which the amount of drive magnet movement is minute, where the antivibration actuator 10 normally operates, a signal substantially proportional to the movement of distance of the drive magnets in a direction perpendicular to the magnetic boundary line is output from the magnetic sensor.

The first magnetic sensor 24a therefore outputs a signal substantially proportional to the amount of translational movement in the Y direction, i.e. the first direction, of the moving frame 14 shown in FIG. 5, and the second magnetic sensor 24b outputs a signal substantially proportional to the translational movement in the X direction, i.e. the second direction, of the moving frame 14. The position to which the moving frame 14 has translationally moved relative to the affixing plate 12 can be determined based on the signals detected by these first and second magnetic sensors 24a and 24b.

Figure 8:
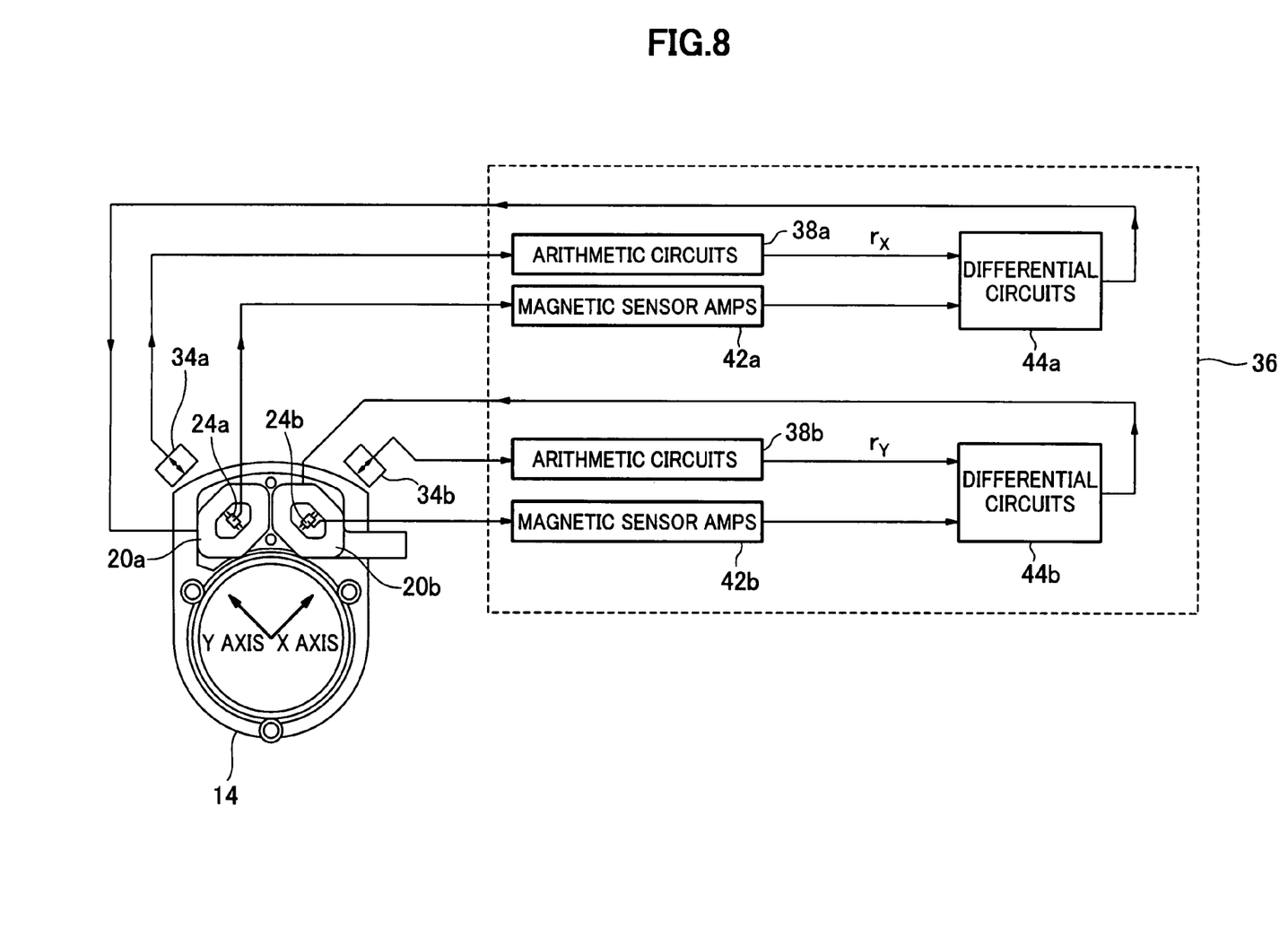
FIG. 8 A block diagram showing signal processing in a controller.

Next, referring to FIG. 8, we discuss control of the antivibration actuator 10.

FIG. 8 is a block diagram showing signal processing the controller 36. As shown in FIG. 8, vibration in the lens unit 2 is detected through continuous sampling by the two gyros 34a and 34b and input to arithmetic circuits 38a and 38b built into the controller 36. In the present embodiment, the gyro 34a detects the angular velocity of the rotation centered on the X axis of the lens unit 2, and the gyro 34b detects the angular velocity of the rotation centered on the Y axis of the lens unit 2.

The arithmetic circuits 38a and 38b produce a lens position command signal commanding, as a time sequence, the position to which the image stabilizing lens 16 is to be moved, based on the angular velocities input by continuous sampling from the gyros 34a and 34b. In other words, the arithmetic circuit 38a time-integrates the angular velocity detected by the gyro 34a and produces a lens position command signal Y axis directional component by adding a predetermined modifying signal; similarly, the arithmetic circuit 38b produces a lens position command signal X axis directional component based on the angular velocity detected by the gyro 34b. By moving the image stabilizing lens 16 at continuous close intervals in accordance with the lens position command signal obtained in this manner, images focused on the image capture element E in the camera body 4 are stabilized even when the lens unit 2 vibrates during exposure of a photograph.

The controller 36 controls the current sourced to the first and second drive coils 20a and 20b so that the image stabilizing lens 16 is moved to a position designated by the lens position command signal produced by the arithmetic circuits 38a and 38b.

The amount of movement of the first drive coil 20a in the Y direction relative to the first magnetic boundary line C1 is measured by the first magnetic sensor 24a, and the measured movement amount is amplified to a predetermined multiple by a magnetic sensor amp 42a. A differential circuit 44a sources a current proportional to the difference between the Y axis directional component of the lens position command signal output from the arithmetic circuit 38a and the amount of movement in the Y axis direction of the first drive coil 20a relative to the first magnetic boundary line C1, as output from the magnetic sensor amp 42a. Therefore when the difference disappears between the Y axis directional component of the lens position commanded by the lens position command signal, and the output from the magnetic sensor amp 42a, current ceases to flow in the first drive coil 20a, and the drive force in the Y axis direction becomes 0.

Similarly, the amount of movement of the second drive coil 20b in the X direction relative to the second magnetic boundary line C2 is measured by the second magnetic sensor 24b, and the measured movement amount is amplified to a predetermined multiple by the magnetic sensor amp 42b. A differential circuit 44b sources a current proportional to the difference between the X axis directional component of the lens position command signal output from the arithmetic circuit 38b, and the amount of movement in the X axis direction of the second drive coil 20b relative to the second magnetic boundary line C2, as output from the magnetic sensor amp 42b. Therefore when the difference disappears between the X axis directional component of the lens position commanded by the lens position command signal, and the output from the magnetic sensor amp 42b, current ceases to flow in the second drive coil 20b, and the drive force in the X axis direction becomes 0.

Note that the drive force generated between the first drive coil 20a and the drive magnet 22 can cause not only translational movement in the Y axis direction of the moving frame 14, but also rotational movement thereof. However, because rotational movement of the moving frame 14 is impeded by the guide means 19, only translational movement in the Y axis direction of the moving frame 14 is generated by the drive force arising between the first drive coil 20a and the drive magnet 22. Similarly, translational movement in the X axis direction only of the moving frame 14 is generated by the drive force arising between the second drive coil 20b and the drive magnet 22.

Next, referring to FIGS. 1 and 8, we discuss the mode of operation of the camera 1 according to an embodiment of the present invention. First, the antivibration actuator 10 provided on the lens unit 2 is activated by turning on the camera 1 antivibration start switch (not shown). The gyros 34a and 34b attached to the lens unit 2 detect vibrations in a predetermined frequency band by close interval sampling, outputting same to the arithmetic circuits 38a and 38b built into the controller 36. The gyro 34a outputs a signal for the angular velocity of rotation centered on the X axis of the lens unit 2 to the arithmetic circuit 38a, and the gyro 34b outputs a signal for the angular velocity of rotation centered on the Y axis of the lens unit 2 to the arithmetic circuit 38b. The arithmetic circuit 38a time integrates the inputted angular velocity signal, calculates a rotary angle, adds to this a predetermined modifying signal, and produces the Y axis direction lens position command signal. Similarly, the arithmetic circuit 38b time integrates the inputted angular velocity signal, calculates a rotary angle, adds to this a predetermined modifying signal, and produces the X axis direction lens position command signal. The image focused on the camera body 4 image capture element E is stabilized by moving the image stabilizing lens 16 at continuous close intervals to positions commanded by the lens position command signal output as a time sequence by the arithmetic circuits 38a and 38b.

At the same time, the first magnetic sensor 24a disposed on the inside of the first drive coil 20a outputs a detection signal to the magnetic sensor amp 42a, and the second magnetic sensor 24b inside the second drive coil 20b outputs a detection signal to the magnetic sensor amp 42b. The magnetic sensor detection signals respectively amplified by the magnetic sensor amps 42a and 42b are respectively input to the differential circuits 44a and 44b.

The differential circuits 44a and 44b generate voltages in response to the difference between the input detection signals from each magnetic sensor and the signals input from the arithmetic circuits 38a and 38b, sourcing currents to each of the drive coils in proportion to these voltages. A magnetic field proportional to the current is generated when current flows in the drive coils. This magnetic field causes the first and second drive coils 20*a* and 20*b* disposed in correspondence to the first and second magnetic boundaries C1 and C2 to respectively receive a drive force, thus moving the moving frame 14. When the moving frame 14 is moved by the drive force and reaches a position designated by the lens position command signal, the output of each differential circuit goes to 0, and the drive force is also 0. If the moving frame 14 departs from the position designated by the lens position command signal due to external disturbance, or to changes in the lens position command signal or the like, current again flows in the drive coils, and the moving frame 14 is returned to a position designated by the lens position command signal.

By continuously repeating the aforementioned operation at close intervals, the image stabilizing lens 16 attached to the moving frame 14 is moved so as to follow the lens position command signal. The image focused on the camera body 4 image capture element E is thus stabilized.

In the embodied antivibration actuator of the present invention, the first drive coil and the second drive coil are disposed in substantially the same plane, so the antivibration actuator can be reduced in thickness in the optical axial direction and, since the first magnetic boundary line and second magnetic boundary line of the drive magnet are disposed to connect, the projected area of the antivibration actuator in the optical direction can be reduced. This enables a reduction in the size of the antivibration actuator.

In the embodied antivibration actuator of the present invention, the image stabilizing lens is positioned on the inside area of the right angle formed by the first magnetic boundary line and the second magnetic boundary line, therefore each of the magnetic boundaries can be placed in closer proximity to the image stabilizing lens, and the projected area of the antivibration actuator in the optical axial direction can be reduced.

Furthermore, in the antivibration actuator of the present embodiment, the first magnetic boundary line and the second magnetic boundary line are registered to form a substantially right angle, so the first direction and second direction in which drive force is generated form a substantially right angle, and the moving frame can be driven efficiently without mutual cancellation of drive forces in the first and second directions. Since the first drive coil and the second drive coil are positioned to be symmetrical with respect to a line bisecting the right angle, drive force can be generated in a balanced fashion in the first and second directions.

In the antivibration actuator of the present embodiment, the first drive coil and the second drive coil are disposed inside a region formed by a first straight line extending from the image stabilizing lens optical axis parallel to the first magnetic boundary line, and a second straight line extending from the optical axis parallel to the second magnetic boundary line, thereby enabling the projected area of the antivibration actuator in the direction of the optical axis to be reduced.

Furthermore, in the antivibration actuator of the present embodiment, the part on which the drive magnet first magnetic boundary line is disposed and the part on which the second magnetic boundary line is disposed are constructed as a single piece, resulting in a smaller part count than was found in conventional antivibration actuators making use of multiple drive magnets.

In the antivibration actuator of the present embodiment, the bisecting line of the angle formed by the magnetic boundaries and the image stabilizing lens optical axis intersect, thereby enabling drive force to be generated in a well balanced manner relative to the image stabilizing lens.

Moreover, in the antivibration actuator of the present embodiment the drive magnet is formed in a shape which is symmetrical with respect to the bisecting line, therefore the distribution of drive magnet mass is symmetrical with respect to the bisecting line, and the generated magnetic field can be made symmetrical with respect to the bisecting line, so that drive force can be generated in a well-balanced manner.

Also, with the antivibration actuator of the present embodiment, each drive coil has a side substantially parallel to each magnetic boundary line, and a side arrayed along the bisecting line, therefore by providing a side along the bisecting line while generating drive force in a direction perpendicular to the magnetic boundary line using the side which is substantially parallel to the magnetic boundary line, the drive coil can be placed in a small space located in close proximity to the bisecting line.

With the embodied antivibration actuator, the drive coil is formed in a shape substantially line symmetrical with respect to a straight line intersecting the first magnetic boundary line at a right angle, therefore the component of the generated drive force parallel to the magnetic boundary line can be canceled, and generation of unnecessary drive force can be avoided.

Also, in the anti-vibration actuator of the present embodiment, each drive coil is constituted as a hexagon having a side substantially parallel to each magnetization boundary line, and a side arrayed along the bisecting line, thereby preventing the generation of unnecessary drive force while enabling the drive coils to be placed in a small space at a position closely proximate to the bisecting line.

Furthermore, in the antivibration actuator of the present embodiment, the magnetic sensors for detecting the magnetism of the drive magnets are disposed inside the windings of the drive coils, thus allowing for combined use as position detecting magnets and as drive magnets and, because the magnetic sensors are disposed inside the drive coil windings, the space needed to place the magnetic sensor can be omitted.

In the above-described embodiments of the present invention, a single drive magnet was used a first magnetic boundary line and a second magnetic boundary line were connected to form a right angle, however a variation is also possible in which the drive magnet 22 comprises a separately formed first drive magnet and second drive magnet. In other words, a first drive magnet provided with a first magnetic boundary line and a second drive magnet provided with a second magnetic boundary line are disposed so that the first magnetic boundary line and the second magnetic boundary line are generally connected, and this is then used as the drive magnet. For example, a drive magnet can be formed into two separate pieces by dividing the drive magnet 22 in the above-described embodiment at the bisecting line C3.

In the embodiment of the present invention described above, the first magnetic boundary line and the second magnetic boundary line were arranged to form a right angle, but the angle formed by the magnetic boundaries may also be an angle other than a right angle.

Furthermore, in the embodiment of the present invention described above, the first magnetic boundary line and the second magnetic boundary line extended in a single direction from the peak of the right angle, but the first magnetic boundary line and the second magnetic boundary line could also be disposed to intersect one another.

Figure 9:
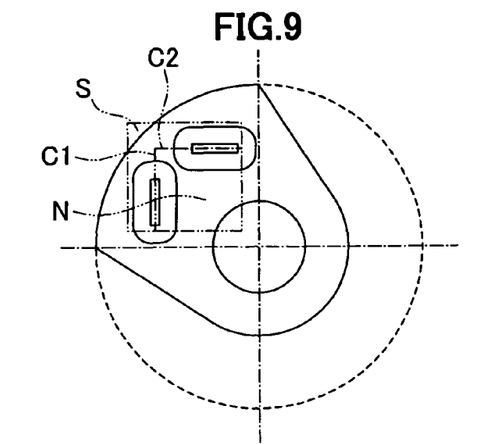
FIG. 9 A diagram showing a variant on the shape and placement of the drive coil.

Also, in the embodiment of the present invention described above, the drive coils were formed as a hexagon, but as a variation the drive coils could also be formed in various shapes. For example, each of the coils can, as shown in FIG. 9, be formed in a generally rectangular shape, with each drive coil disposed so that the long axis of the rectangle overlaps each of the magnetic boundaries of the drive magnets.

Figure 10:
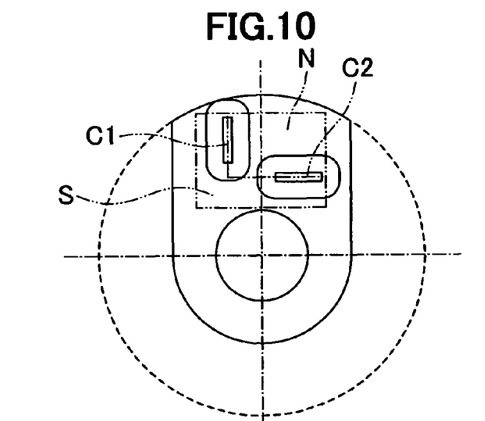
FIG. 10 A diagram showing a variant on the shape and placement of the drive coil.

Furthermore, in the embodiment of the present invention described above, the image stabilizing lens was disposed inside the region defined by the extension lines of the first magnetic boundary line and the second magnetic boundary line. In other words, the first magnetic boundary line and the second magnetic boundary line are registered so that the image stabilizing lens is positioned within a 90° angle formed by the extension of each magnetic boundary line from the peak formed by the first magnetic boundary line and the second magnetic boundary line. As a variation, each magnetic boundary line could also be registered so that, as shown in FIG. 10, the image stabilizing lens is positioned outside the angle formed by the first magnetic boundary line and the second magnetic boundary line.

Figure 11:
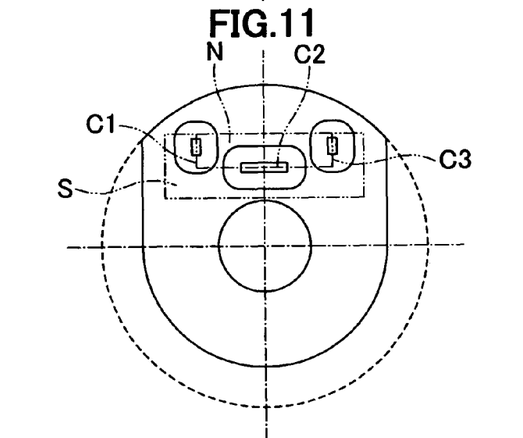
FIG. 11 A diagram showing a variant on the shape and placement of the drive coil.

In the embodiment of the present invention described above, only a first magnetic boundary line and a second magnetic boundary line were formed on the drive magnet, but as a variation, three or more magnetic boundaries could be provided. In the example shown in FIG. 11, a third magnetic boundary line C3 is formed in addition to the first magnetic boundary line C1 and the second magnetic boundary line C2 on the drive magnets, and three drive coils are also disposed in correspondence thereto.

We have discussed above preferred embodiments of the present invention, however various changes can be added to the above-described embodiments. In particular, in the embodiment described above, the invention was applied to a digital still camera, but the present invention can also be applied to film cameras, video cameras, and the like. In the above-described embodiment the drive coil was attached to the fixed portion, and the drive magnet was affixed to the movable portion, but the drive coil can also be attached to the movable portion, and the drive magnet attached to the fixed portion.

EXPLANATION OF REFERENCE NUMERALS

A1 Optical axis
C1 First magnetization boundary line
C2 Second magnetization boundary line
C3 Bisecting line
1 Camera
2 Lens unit
4 Camera body
6 Lens barrel
8 Imaging lenses
10 Antivibration actuator
11 Affixing plate
12a Aperture portion
12b Flat plate portion
14 Moving frame
16 Image stabilizing lens
18 Steel balls
19 Guide means
19a L-shaped shaft
19b Fixed-side sliding bearing
19c Moving-side sliding bearing
20a First drive coil
20b Second drive coil
22 Drive magnet
24a First magnetic sensor
24b Second magnetic sensor
26 Attracting yoke
28 Back yoke
30 Steel ball receiver
32 Steel ball receiver
34a, 34b Gyros
36 Controller
38a, 38b Arithmetic circuits
42a, 42b Magnetic sensor amps
44a, 44b Differential circuits
110 Actuator
112 Fixed portion
114 Movable portion
118 Steel balls
120 Drive coils
122 Drive magnets

The invention claimed is:

1. An antivibration actuator for moving an image stabilizing lens within a plane perpendicular to the optical axis thereof, comprising:
a fixed portion;
a movable portion to which the image stabilizing lens is attached; and
drive means for generating drive force in a first direction and a second direction so that the movable portion is moved within a plane perpendicular to the optical axis of the image stabilizing lens;
the drive means including a single drive magnet disposed on one of either the fixed portion or the movable portion;
a first drive coil and second drive coil which are attached to the other of either the fixed portion or the movable portion and disposed on substantially a same plane; and
wherein the drive magnet is provided with a first magnetic boundary line and a second magnetic boundary line disposed to connect to the first magnetic boundary line;
wherein the first drive coil is disposed facing the first magnetic boundary line, and drive force is generated in the first direction when current flows therein; and
wherein the second drive coil is disposed facing the second magnetic boundary line, and drive force is generated in the second direction when current flows therein.

2. The antivibration actuator of claim 1, wherein the first magnetic boundary line and the second magnetic boundary line are registered so that the image stabilizing lens is positioned within a region defined by their extension lines of the first and second magnetic boundary lines.

3. The antivibration actuator of claim 1, wherein the first magnetic boundary line and the second magnetic boundary line are registered to form a substantially right angle, and the first drive coil and the second drive coil are respectively positioned to be line symmetrical with respect to a bisecting line of the right angle.

4. The antivibration actuator of claim 1, wherein the first drive coil and the second drive coil are disposed in their entireties within a region formed by a first straight line extending from the optical axis of the image stabilizing lens parallel to the first magnetic boundary line, and a second straight line extending from the optical axis of the image stabilizing lens parallel to the second magnetic boundary line.

5. The antivibration actuator of claim 1, wherein the first magnetic boundary line and the second magnetic boundary line are positioned so that a bisecting line of the first and second magnetic boundary lines and the optical axis of the image stabilizing lens intersect.

6. The antivibration actuator of claim 1, wherein the drive magnet is formed in a shape which is substantially line symmetrical with respect to a bisecting line of the first and second magnetic boundary lines.

7. The antivibration actuator of claim 1, wherein the first drive coil is formed in a shape substantially line symmetrical with respect to a straight line intersecting the first magnetic boundary line at a right angle; and the second drive coil is formed in a shape substantially line symmetrical with respect to a straight line intersecting the second magnetic boundary line at a right angle.

8. The antivibration actuator of claim 1, further comprising a first magnetic sensor and a second magnetic sensor for respectively detecting displacement of the movable portion in the first direction and the second direction by detecting the magnetism of the drive magnet;
- wherein the first magnetic sensor is disposed inside the first drive coil winding, and the second magnetic sensor is disposed inside the second drive coil winding.

9. A lens unit, comprising:
a lens barrel;
an image capturing lens disposed within the lens barrel; and
the antivibration actuator of claim 1, attached to the lens barrel.

10. A camera, comprising:
the lens unit of claim 9; and
a camera body to which the lens unit is attached.

11. An antivibration actuator for moving an image stabilizing lens within a plane perpendicular to the optical axis thereof, comprising:
- a fixed portion;
- a movable portion to which the image stabilizing lens is attached; and
- drive means for generating drive force in a first direction and a second direction so that the movable portion is moved within a plane perpendicular to the optical axis of the image stabilizing lens;
- the drive means including a drive magnet disposed on one of either the fixed portion or the movable portion;
- a first drive coil and second drive coil which are attached to the other of either the fixed portion or the movable portion and disposed on substantially a same plane; and
- wherein the drive magnet is provided with a first magnetic boundary line and a second magnetic boundary line disposed to connect to the first magnetic boundary line;
- wherein the first drive coil is disposed facing the first magnetic boundary line, and drive force is generated in the first direction when current flows therein;
- wherein the second drive coil is disposed facing the second magnetic boundary line, and drive force is generated in the second direction when current flows therein;
- wherein the first drive coil is constituted to have a side substantially parallel to the first magnetic boundary line, and a side arrayed along a bisecting line of the first and second magnetic boundary lines; and
- the second drive coil is constituted to have a side substantially parallel to the second magnetic boundary line, and a side arrayed along the bisecting line.

12. The antivibration actuator of claim 11, wherein the first drive coil is constituted as a hexagon having a side substantially parallel to the first magnetic boundary line, and a side arrayed along the bisecting line; and
the second drive coil is constituted as a hexagon having a side substantially parallel to the second magnetic boundary line, and a side arrayed along the bisecting line.

* * * * *